United States Patent [19]

Baughcom et al.

[11] 3,992,297
[45] Nov. 16, 1976

[54] OIL SEPARATOR DEVICE

[76] Inventors: Elisha J. Baughcom, Rte. 1, Box 15A, Newington, Ga. 30446; Daniel C. Lee, Sr., 223 Lawton Ave., Savannah, Ga. 31404

[22] Filed: Feb. 18, 1976

[21] Appl. No.: 659,109

[52] U.S. Cl. .............................. 210/104; 210/128; 210/135; 210/188; 210/305; 210/307; 210/519; 210/522; 210/540; 55/166; 55/172; 55/176

[51] Int. Cl.² ..................... B01D 21/24; B03D 3/00

[58] Field of Search ................. 210/96 R, 103, 104, 210/110, 114, 115, 128, 134, 135, 188, 242 R, 259, 260, 304, 305, 307, 519, 542, 540, 26, 27; 55/165, 176, 172, 182, 160, 166

[56] References Cited
UNITED STATES PATENTS

| | | | |
|---|---|---|---|
| 1,790,911 | 2/1931 | Gibson | 55/165 |
| 2,651,415 | 8/1953 | Worthen et al. | 210/522 X |
| 3,425,556 | 2/1969 | Volker | 210/104 |
| 3,769,779 | 11/1973 | Lildestaand | 55/166 |
| 3,836,000 | 9/1974 | Jakubek | 210/104 |

*Primary Examiner*—John Adee
*Attorney, Agent, or Firm*—Paul E. Friedemann; Arthur S. Stewart

[57] ABSTRACT

This invention provides a separator for two relatively insoluble mixed liquids of different specific gravities as, for example oil and water. More particularly the invention relates to a bilge oil separating system (BOSS), or apparatus and includes a float controlled bilge pump for pumping the oil contaminated bilge water from a ship's bilge into a splatter chamber, that, to considerable measure, undoes the globularization of the oil caused by the bilge pump. This is effected by changing the rather rapid downward flow of the mixed liquids out of the delivery tube to a hollow jet type outwardly and upwardly directed flow that then changes to a hollow cylindrical downward flow against the inner cylindrical surface of the wall of a splatter chamber. The oil, after the globules are thus coalesced, moves with the water down into diffuser which serves the liquid to the bottom of an obliquely upwardly extending channel provided internally with downwardly projecting baffles to collect the oil in pockets at the ceiling of the channel to effect gravitational separation of the two liquids and to dampen out any sloshing about of the two-phase liquid. The channel delivers the liquid to the top of an oil-bath water cleaner from which the oil overflows and the cleaned water passes successively through a plurality of superposed slanting reverse flow chambers from which, through weep holes at the upper part of each chamber, the oil that may have gotten as far as the reverse flow chambers flows up into the overflow to be thus recovered, and the clean water is pumped overboard.

20 Claims, 4 Drawing Figures

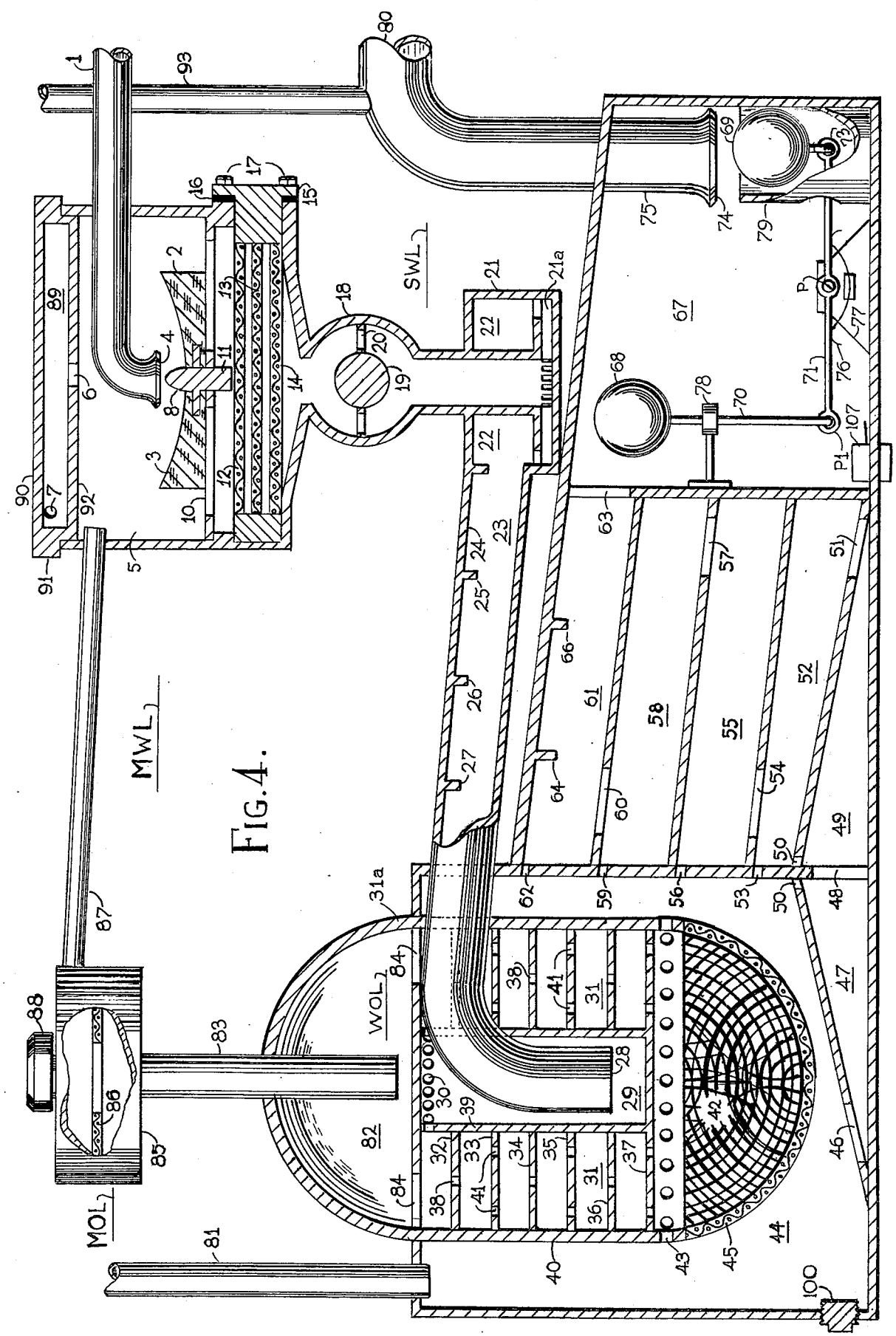

OIL SEPARATOR DEVICE

Before discussing the details of this invention a brief statement of the reasons for its origin and a brief discussion of samples of the prior art may be helpful.

BACKGROUND OF THE INVENTION

In recent years the public has become very much aware of the serious damage done to the aquatic ecology by the large oil spills that have resulted from accidents at offshore drilling cites, or that have befallen oil tankers at sea, near shore, or when actually in harbor.

At times, for reasons known only to the crew of a tanker, oil is pumped over-board.

Great sums of money and effort have been spent to clean up such spills. The prior art shows ships, barges, and floating tanks all provided with means for skimming oil and water off the sea surface, and transferring the mix to settling tanks and then recovering the oil from the tanks.

In some cases floating vessels use mops alleged to have a special affinity for oil. These mops are squeezed out on board the vessel and then reused to gather more oil.

All these devices above briefly mentioned are very expensive and deal with spectacular oil spills after they have happened, when the real problem is to provide means to prevent oil pollution of the marine environment.

The spectacular pollutors are not the only pollutors who are a menace to the marine environment.

There is a large group of vessels and boats, from fishing ships, to shrimp boats, crab-trap operators, pleasure crafts, and oyster gathering boats from which the bilge water, comprising a mixture of oil and water, is regularly pumped overboard.

All these operations take place off shore and in the many tidal streams, comprising small channels and big rivers, that separate literally hundreds of islands from the mainland. The greatest concentration of these waterways and islands in the United States is along the North Carolina, South Carolina, and Georgia coasts.

The islands are low and flat, regularly subject to tidal baths, and thus produce protein food in the marsh grass greater, the experts report, than in any comparable area of farm land.

All these vessels and boats are ideally suited for the installation on the craft of an oil and water separator to prevent pollution of the streams and marshland.

The prior art publications disclose not very many oil and water separators to used sued on the craft, and thus address the problem of preventing pollution.

Two examples of prior art, addressing the mentioned problem, are the U.S. Pat. to Niclausse U.S. Pat. No. 801,679 and the patent to Johnston U.S. Pat. No. 966,022.

From the literature of devices of this kind, such devices, possibly because of their high cost, or their mechanical complexity, or both, seem never to have been on the market, nor ever to have been in public use.

This invention provides for the separation of the oil from the bilge water in the hold of a ship by a device mounted on board that is, not affected by the ship's movements in roll or pitch, or both, and that is also "fail safe" by preventing unclean water from being pumped overboard.

A broad purpose of this invention is to prevent oil spills from a ship using the device embodying this invention so as not to damage the aquatic ecology.

As the description procedes reference will be made to a shrimp boat, but the use of this device on a shrimp boat is merely illustrative. The device may be used on any other type of boat as well, or may be designed as a large floating craft to gather oil and water off the surface of a body of water contaminated with an oil spill.

A shrimper has to carry a good bit of ice on-board his shrimp boat to keep his catch chilled, and, since the best shrimping takes place during the summer heat, there is considerable melting of ice. This ice water flows into the hold of the ship. The bilge water build-up is often augmented by annoying though not dangerous hull leaks. Frequent pumping of bilge water over-board is thus necessary.

However, this bilge water gets very contaminated and the major contaminant is oil. This oil usually is a mixture of oils such as crankcase oil from the engine, fuel oil, and other oils spread deliberately over the bilge water by the crew. The rationale of the deliberate spreading of oil on the bilge water by the crew is that the oil very effectively dampens the sloshing about of the bilge water and very effectively reduces stifling odors.

The great need therefore is to carry a bilge water cleaning device on-board, that is interposed between the bilge pump discharge opening and the final discharge opening, so that, by its use, only clean water goes over-board.

Other objects and merits of this invention will become apparent from the following detailed description when studied in the light of the accompanying drawings wherein like components, shown in the figures, are indicated by like numerals and wherein:

BRIEF DESCRIPTION OF THE DRAWINGS

FIG. 4 is a longitudinal sectional view in a vertical plane of the invention.

Figure 1:
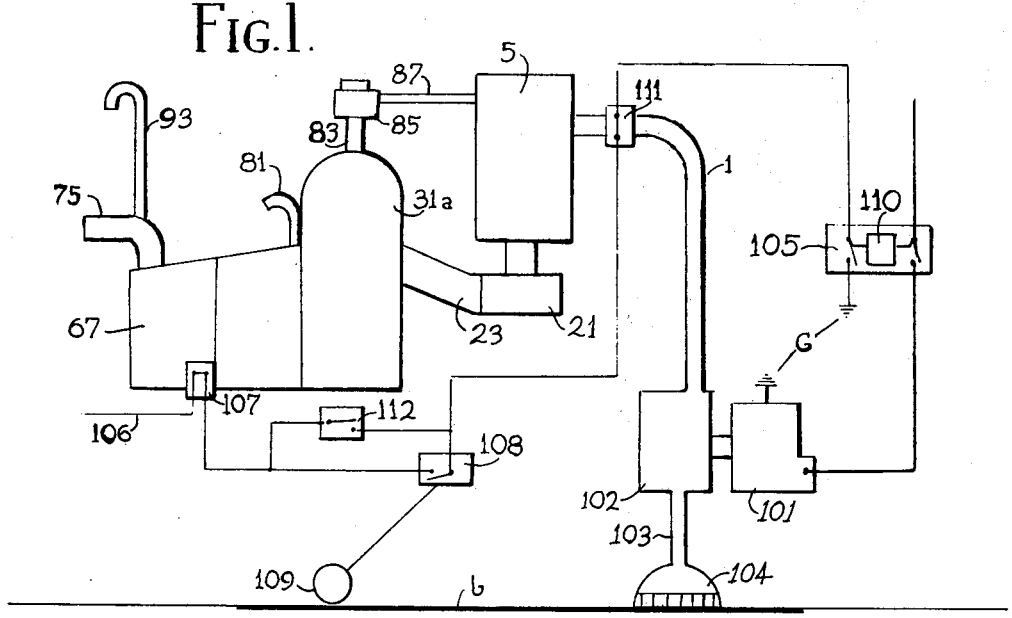
FIG. 1 is a schematic showing of the six principal parts of the invention together with such electric circuitry and coacting prior art devices that are needed.

The invention, as shown very schematically in FIG. 1, comprises six principal parts, namely, a receiver chamber or splatter box, a diffuser, a riser channel or tube, an oil-bath water cleaner or scrubber, a gravitational separator, and a differential float chamber.

The functions of each of these parts will become more apparent from a study of a typical operating cycle.

The electric terminals are provided for supplying electric energy to the motor 101 operating the bilge pump 102. The bilge pump 102 is provided with an intake hose 103 connected at its intake end to a screen 104 for preventing the pump 102 from picking up any solid objects too large for the pump 102 to handle.

As shown in FIG. 1 a solenoid operated switch 105 is provided for connecting the motor 101 to supply terminals. A control circuit 106, connected to suitable supply terminals, included balance arm operated switch 107, the float operated switch 108 operated by float 109, a switch 105 operated by solenoid 110, liquid pressure responsive switch 111 and then to ground G.

The float operated switch 108 closes only when the liquid in the bilge *b* rises above a selected level and then opens only when the float 109 gets back to the bottom of the bilge *b*.

The switch 107 is a sealed normally closed switch, but it does open when the balance arm 71 of the differential floats is in a given position, (See FIG. 4). Switch 111 is a normally closed switch, but opens when the liquid pressure in the delivery tube 1 rises above a selected value.

The switch 112 is a normally open switch and, being connected in parallel to switch 108, is used only when the need arises for manually starting motor 101.

The whole device for separating oil from the bilge water of ship, regardless of whether the device is a small unit on a small ship or a large unit on a large ship, is preferably mounted below deck in midship position. If convenient the position should be near the intersection of the roll and pitch axes of the ship.

Figure 2:
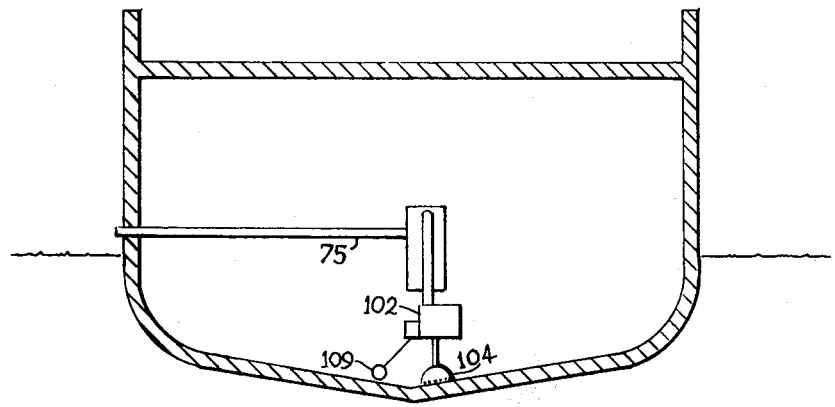
FIG. 2 is a schematic showing of portions of the invention when installed on a small vessel.
Figure 3:
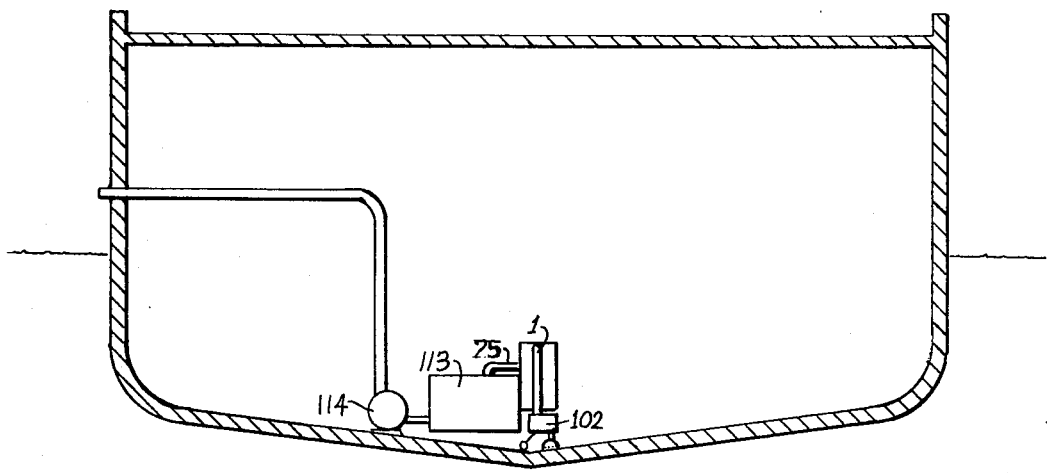
FIG. 3 is a schematic showing of portions of the invention when installed on a large vessel.

FIG. 2 is a sectional view transverse of a small vessel taken directly in front of the installed schematically shown oil separator device, looking toward the stern. FIG. 3 is a similar showing with the device installed on a large vessel.

When installed on a small boat, the exit opening of tube 75 will be well above the water line and motor 101 and pump 102 may be used, as shown, to pump the clean water directly overboard.

When the oil separator device is mounted onboard a large vessel the location of the device will be below the water level. In this case motor 101 and pump 102 are used to pump the clean water into a temporary storage tank 113. A separate pumping system 114 is then used to empty the tank 113 from time to time.

Before the bilge oil separating system can be used the apparatus has to be filled with water and oil. The amount of each liquid needed to fill the apparatus will be indicated on the outside of each apparatus.

To fill the device with liquid the intake hose 103 of the pump 102 is inserted into a suitable tank containing clean water and the pump is started by closing switch 112. When water begins to flow from the exit opening of pipe 75, the pump is stopped. The water will then be at the static water level indicated by line SWL.

Now the oil filler cap 88 of the scrubber is removed and oil, preferably clean lubricating oil, is poured down through the excess-air vent oil sump 85 and down the excess-air vent pipe 83 and through openings 84 into the oil-bath water cleaner 31*a*. Enough oil is added to somewhat compress the air trapped in the dome 82 and to fill the oil-bath cleaner or scrubber to the working oil level line WOL.

The addition of oil to the level WOL will cause the liquids to seek their hydrostatic balance, with the result that some clean water will flow from the discharge pipe 75. The filling of the device is preferably done in port at dockside when the boat is at rest.

The merits of this invention can very probably be best understood from a study of a typical operating cycle.

When the bilge water in the bilge of a ship using this invention rises to a selected level, the float operated switch 108 closes and the motor 101 is started to operate pump 102. The pump then delivers liquid through the delivery tube 1 to the splatter chamber 5.

A safety feature is provided to stop the motor 101 when the liquid pressure in tube 1 rises above a selected value. This happens when the water level rises higher than the indicated maximum water level, MWL. The limit float 2 then rises high enough so that the conical valve area 3 coacts with the lower end 4 of the delivery tube 1, thus raising the liquid pressure in tube 1. When the liquid pressure thus rises switch 111 opens and the motor stops.

The receiver chamber or splatter chamber 5 is provided with suitable vents 6 and 7 to prevent the buildup of a back pressure.

The discharge end 4 of tube 1 is flared outwardly so as to increase the internal sectional area. The upper guide stem 8 of the limit float 2 is conical and ends in a rounded upper end. This construction of the guide stem 8 and the lower end 4 of delivery tube 1 provides for a smooth unhurried non-cavitating flow of the liquid onto the conical region 3 of the limit float 2.

A centrifugal pump, even when the impellers are stiff rubber the preferred type of impellers for use with this invention, churns up the bilge water so that air bubbles and some of the oil in globular condition enters the splatter chamber 5.

The main purposes of the splatter chamber 5 are to get rid of most of the air; to slowdown the liquid flow, and to deglobularize the oil.

The discharge from the end 4 of the delivery tube 1 onto the conical portion 3 of the limit float is rather rapid but as the liquid strikes the float the liquid flow changes to a hollow flow directed outwardly and upwardly and then changes to a slow hollow cylindrical downward flow against the inner cylindrical surface of the wall of the splatter chamber 5. Since the horizontal sectional area of the splatter chamber 5 is many times greater than the transverse sectional area of the delivery tube 1 the downward flow of the liquid in the splatter chamber 5 is very slow compared to the flow from the delivery tube 1, with the result that most of the air readily vents out through vent holes 6 and 7, and all space under the limit float is occupied by liquid.

The change in flow direction, the contact with the inner surface of the splatter chamber 5, and the slowdown all contribute to eliminate most of the oil globules.

After the bilge water leaves the region of the limit float it flows through the spider 10 having a suitable central bearing opening for the lower guide stem 11 of the limit float 2.

The liquid then passes through a plurality of screen 12, 13 and 14 of graduated screen size, from the coarse screen 12 to the fine screen 14. This eliminates all, but very minute, solid particles from the system beyond the receiver chamber 5.

The receiver chamber 5, as shown, is a cylindrical structure with the screens nested in the circular portion of a U-shaped screen retainer 15. The screen retainer 15, is, through a suitable sealing gasket 16 and bolts 17 secured to a flat portion of the receiver chamber 5.

The nested screens may thus readily be removed from chamber 5 by sliding the U-shaped structure from the chamber, of course, after the bolts are removed. The screens may thus be readily cleaned and then reinserted.

The material used in this service may be of many kinds, but for economy any one of the many plastics known in in the art may be used, or the entire structure may be impregnated fiber glass.

After the liquid leaves the receiver chamber 5 it enters the oil trap 18 having a suitable divider 19 mounted on a spider 20.

The bilge water then enters the diffuser 21 from the top, or from above, and first strikes the diffuser plate 21a. This plate throws the liquid outwardly and upwardly and, since oil has a lower specific gravity then water, the oil first fills the top of the diffuser in an oil pocket at 22. As top 22 fills the oil spills out and upwardly into the riser chamber, or tube 23.

The riser chamber 23 has an upwardly sloping ceiling 24 from which a plurality of baffles, as 25, 26 and 27, etc., project downwardly to form oil pockets.

The ceiling slope and the length of the baffles are so chosen that the bottom end of each baffle is at a lower level than the top end of the preceding baffle.

This is an important feature of this invention, because the amount of oil trapped in each pocket forms an oil damping effect for the mixture of liquids in the separator. The function of the separator is thus not harmfully affected by the rolling and pitching of the ship.

The liquid, after leaving the riser chamber, or tube 23, flows down the down-pipe 28 to the bottom of the annular inner water chamber 29. This chamber, being closed at the bottom, now directs the liquid upwardly and out through many openings 30, to the top of the annular oil chamber 31.

The total area of the openings 30 should be greater than the horizontal sectional area of the down-pipe 28 to eliminate any back pressure.

The inside of the oil chamber 31 is provided with a plurality of vertically spaced annular barriers 32, 33, 34, 35, 36, and 37. As shown there are six barriers. There may be more barriers, and possibly fewer could be used.

The first barrier 32 has a circle of perforations 38 equally spaced from the side walls 39 and 40 and the second barrier 33 has two circles of spaced perforations 41, one being near the outer side wall 40 of the oil chamber 31 and the other being near the inner side wall 39 of the oil chamber 31.

The third barrier 34 is exactly like the first barrier 32 and the fourth barrier 35 is exactly like the second barrier 33. The fifth barrier 36 is exactly like the first barrier 32 and the sixth barrier 37 is exactly like the second barrier 33. The number of barriers and holes per barrier is merely illustrative. The important thing is to globularize the water.

By this construction the liquid is, by gravity, forced in a circuitous path through the oil in the oil chamber. Since the oil introduced by the liquid mixture of water and oil, into the oil chamber has an affinity for the oil already in the oil chamber 31 enough oil always remains in the oil chamber 31 to keep it permanently filled, but the water is broken up into small globules by the perforations in the barriers.

In observing the operation of a transparent model of the oil-bath water cleaner it was observed that the globules spin as they emerge from the perforations. Just why the globules spin is not apparent, but one function is certain the film of oil on each globule of water extracts the remnants of oil and such minute suspended particles as have an affinity for oil from the water. When the globules coalesce, releasing the oil films, the water is quite clean.

The liquid, after emerging from the opening in the last barrier 37 is forced into the globule chamber 42. The excess oil, collecting over the water, passes out through the openings 43 into the oil discharge chamber 44.

The water and such globules of water as have not yet coalesced pass down through the hemispherical screen 45. As the water globules pass through the screen openings the globules coalesce giving up their oil films on the screen and the oil released flows upwardly on the screen surface to join the rest of the oil already in the oil discharge chamber 44.

The water, now almost free of oil, passes through exit opening 46 down into the first reverse flow chamber 47. In chamber 47 the water flows toward the right and out through the exit opening 48 into the second reverse flow chamber 49. Both these chambers 47 and 49 have weep holes 50 at the top to permit any oil still in the water to flow out into the oil discharge chamber 44.

From chamber 49 the water flows out through exit opening 51 into chamber 52. Chamber 52 has a weep hole 53 and an exit flow opening 54 at the higher end of chamber. This opening 54 directs the water flow into chamber 55, having the weep hole 56 and the exit opening 57. Opening 57 admits the water into chamber 58 having the weep hole 59 and the exit opening 60. Opening 60 admits the water into chamber 61, having the weep hole 62 and the exit opening 63 for discharging water into chamber 67.

Chamber 61 has a plurality downwardly projecting baffles 64 and 66 for collecting such remnants of oil that may possibly have gotten as far as chamber 61. Any oil trapped at each side of the baffles 64 and 66 produces a damping action on the liquid in the reverse flow chambers.

These chambers 47, 49, 52, 55, 58 and 61 and their exit openings are rather large in sectional areas in relation to the sectional area of the delivery tube 1, and the baffles having the exit openings and separating the chambers, are arranged at a slant. This construction provides a quiescent condition and a reverse flow for the water. Both these features aid in separating the oil from the water.

By the time the water reaches chamber 61, it has been completely cleaned of oil so that only oil free water flows through exit opening 63 into the differential float chamber 67. If the six reverse flow chambers shown do not completely purge the water of contaminants then only more such reverse flow chambers need be used. For the tests conducted six reverse flow chambers were found to be enough.

The differential float assembly comprises two floats 68 and 69. The upper float 68 is at its bottom ridgidly secured to the stem 70, which in turn is pivotally secured at P1 to the balance arm 71. The stem 70 and thus the float 68 is guided by bearing assembly 78.

The float 69 disposed in a guide cage 79 is, through a short stem and swivel pivot 73, secured to the balance arm 71. The length of the moment arm from the pivot at P to the center of bouyancy of float 69 is so chosen that when the balance arm rotates counter-clockwise a sufficient amount, the float 69 will effectively close the intake opening 74 of the discharge tube 75.

The floats are so chosen that their bouyant forces are as near equal as possible. The moment arm lengths are so chosen for floats 68 and 69 that the upward force at pivot P1 is substantially equal to the upward force at pivot 73.

Since the differential float chamber 67 is, during proper operation completely filled with clean water the floats will remain in the position shown.

There may possibly be times for some instability of the floats, to stabalize the floats a weak leaf spring 76 could be secured at its middle to the pivot support 77 with the outer ends of the spring just touching the bottom of the balance arm 71 as shown, to act as a damper.

When for any reason there is a great amount of oil on top of the bilge water, or the oil discharge pipe 81 becomes clogged and only oil is pumped into the device and the differential float chamber 67 begins to fill with oil from the top, the upper float 68 becomes surrounded by oil. When this happens the buoyancy of the upper float decreases with the result that the balance arm 71 rotates counter-clockwise and float 69 effectively stops any flow of water at the intake opening 74 for the discharge tube 75.

During normal functioning of the device clean water only flows from the outlet 80. The outlet 80 is by a suitable hose, not shown, connected to it and the hose is positioned to cause the water to flow overboard, or into a storage tank.

To prevent the possibility of the establishment of a syphoning action that might empty the device, an anti-syphoning pipe 93 is connected to the dishcarge pipe 75.

During the normal, and which is also the usual, pumping cycle more and more oil collects in the oil chamber 44. As the level of the oil rises in chamber 44, the level gets higher than the maximum oil level, MOL, and oil flows freely from the top of the oil discharge tube 82. In actual practice a suitable hose is connected to the top of the tube 81 and the hose directs the oil into a suitable storage tank.

During the regular operation excess air forces the working oil level, WOL, down in the dome 82 until the excess air can escape up the excess-air vent tube 83. The air carries some oil up with it in the form of a froth which collects on the screen 86 in the oil sump 85.

Since the scrubber oil filler cap 88 is closed, as it should be during use of the device, the air passes through tube 87 to the receiver chamber 5.

The receiver chamber is covered by a lid 89 having a ceiling 90, a cylindrical portion 91 that fits snugly by a not too tight press fit into the top of the receiver chamber 5. The lid has a floor portion 92 secured to the cylindrical portion 91 having a vent opening 7.

The floor portion has a vent 7 disposed directly over the end of the delivery tube 1. This positioning of the vent opening prevents the possibility of having bilge water being spilled on a clean deck, or other place onboard where the device is installed.

The froth in the air vent oil sump 85 may drain back to the bottom of the dome 82, but if it does not the excess air will eventually carry the froth into the receiver 5 to thus be recycled.

The oil trap 18 does not, during the working cycle, that is, during the time when there is a continuous flow of liquid through the device, alter the operation of the device, but at the end of each pumping cycle some water but mostly oil and an oil and air froth is introduced into the splatter chamber 2.

The oil trap 18 is located at the static liquid level, when the apparatus is at rest, which is, of course, below the working liquid level. During the rest period between pumping cycles the froth collapses releasing its air which is vented from the splatter chamber 2 and the oil, now in liquid form, drains down and collects at the divider 19 above the water in the oil trap 18. At the next pumping cycle the liquid, coming down form the splatter chamber 2, forces the oil down and through the device.

Plug 100 provides means for draining the devices when such draining may be needed, as during flushing and cleaning.

No manufacturing design details of any of the six principle parts have been given, except, in a measure, of the splatter chamber 5. The man skilled in the art shall be well able, after a study of this specification schematically describing the apparatus and in detail pointing out the novel functions and results obtained by each unit, to provide his own design and manufacturing details.

For example, each of the units as the splatter chamber 5, oil trap 18, oil sump 85, diffuser 21, riser chamber 23, oil-bath water cleaner 31a, the reverse flow gravitational separator having a plurality of chambers as 47, 49, 52, 55, 58, and 61, and the differential float chamber 67 and its contents, may all be built as separate units.

The units may be arranged and secured to each other in tandem as schematically shown in FIG. 1, or the units may be designed to fit together about a common center to provide a compact cylindrical tank for the whole device.

What is claimed as new and therefore to be protected by Letters Patent is:

1. A device for cleaning water that has been contaminated by oil that is insoluable in water and has a specific gravity lower than water or that has been contaminated by any other similar liquid, comprising,
    a riser chamber disposed at a slant,
    pumping means for supplying a continuous flow of the contaminated liquid to the bottom of said slanting riser chamber,
    said riser chamber having a ceiling,
    a plurality of downwardly projecting baffles secured in spaced relation to the ceiling to form pockets for the oil along the ceiling to thus facilitate separation of the liquids of different specific gravities and to dampen out oscillations of the mixed liquids in the riser chamber,
    an oil-bath water cleaner, including an oil-filled chamber,
    means at the upper end of the riser chamber for delivering, in a continuous flow, the contaminated liquid to the top of the oil-filled chamber, where the oil in the contaminated liquid, having an affinity for the oil already there, combines with the oil in the oil-filled chamber to keep it full, and the excess oil moves down with the water into an intermediate chamber having openings along its top outer side where the oil separates out into an oil chamber, and the water passes down through suitable openings at the bottom of the intermediate chamber into the bottom of the oil chamber,
    means for removing oil from the top of the oil chamber, and
    means for removing the clean water from the bottom of the oil chamber.

2. A device for cleaning water that has been contaminated by oil that is insoluable in water and has a specific gravity lower than water or that has been contaminated by any other similar liquid, comprising,
    a splatter chamber having air vent openings at the top,
    pumping means for supplying a continuous flow of contaminated liquid into the top of the splatter chamber through a delivery tube having a flared downwardly directed end, a fluid flow controlling float provided with suitable guides so that the top of the float coacts with the flared end of the delivery tube, and the float having a shape at its top so made that the small cylindrical flow of the liquid eminating from the end of the delivery tube is changed to a hollow outward and upward flow and then spills over, in a slow hollow downward flow, over the outer surface of the float and against the inner walls of the splatter chamber whereby most of the air carried by the liquid into the splatter chamber escapes through the vent openings, and the globularization of the oil that may have been produced by the pumping means is substantially eliminated, a riser chamber disposed at an upwardly directed slant, means for transferring the liquid from the splatter chamber to the bottom of said slanting riser chamber, said riser chamber having a ceiling, a plurality of downwardly projecting baffles secured in spaced relation to the ceiling to form pockets for the oil along the ceiling to thus facilitate separation of the liquids of different specific gravities and to dampen out oscillations of the mixed liquids in the riser chamber, an oil-bath water cleaner, including an oil-filled chamber, means at the upper end of the riser chamber for delivering, in a continuous flow, the contaminated liquid to the top of the oil-filled chamber, where the oil in the contaminated liquid, having an affinity for the oil already there, combines with the oil in the oil-filled chamber to keep it full, and the excess oil moves down with the water into an intermediate chamber having openings along its top outer side where the oil separates out into an oil chamber, and the water passes down through suitable openings at the bottom of the intermediate chamber into the bottom of the oil chamber, means for removing oil from the top of the oil chamber, and means for removing the clean water from the bottom of the oil chamber.

3. A device for cleaning the bilge water of a ship contaminated with oil, comprising, a bilge water pump, a motor for operating the pump, a switch for starting and stopping said motor, a float disposed in the bilge of the ship for controlling said switch, a splatter chamber having a vent opening near its top closed end, a delivery tube one end connected to the discharge end of the pump and the other end disposed, in a downwardly directed end, in the splatter chamber, said splatter chamber having an inner transverse sectional area many times greater than the downwardly directed end of the delivery tube, means in the splatter chamber for spreading the liquid outwardly against the inner surface of the splatter chamber to thus very much slow down the downward flow of the liquid to cause air separation and venting of the air from the liquid, and to cause coalescense of the globules of oil in the liquid, an upwardly slanting riser chamber having a ceiling, a plurality of downwardly projecting baffles secured in spaced relation to the ceiling to form pockets for the oil along the ceiling to thus facilitate separation of the liquids of different specific gravities and to dampen out oscillations of the mixed liquids in the riser chamber, an oil-bath water cleaner, including an oil-filled chamber, means at the upper end of the riser chamber for delivering, in a continuous flow, the contaminated liquid to the top of the oil-filled chamber, where the oil in the contaminated liquid, having an affinity for the oil already there, combines with the oil in the oil-filled chamber to keep it full, and the excess oil moves down with the water into an intermediate chamber having openings along its top outer side where the oil separates out into an oil chamber, and the water passes down through suitable openings at the bottom of the intermediate chamber into the bottom of the oil chamber, means for removing oil from the top of the oil chamber, and means for removing the clean water from the bottom of the oil chamber.

4. An apparatus for removing oil from the surface of water contaminated with oil, comprising, a slanting riser chamber having a lower contaminated water receiving end and an upper liquid discharging end, means for delivering the contaminated water to receiving end, a ceiling for the riser chamber provided with a plurality of downwardly projecting baffles spaced along the ceiling, to form pockets for retaining oil at the ceiling between the baffles, whereby sloshing about of the liquid in the riser chamber is dampened, an oil-bath water cleaner comprising, an oil-filled chamber, means for delivering the contaminated water from the discharge end of the riser chamber in a continuous slow flow to the top of the oil-filled chamber, where the oil in the water separates out to combine with the oil already in the oil-filled chamber and the water and excess oil flow down into an oil discharge from which the oil flows to a place of storage, and means for removing the clean water from the bottom of the oil discharge chamber.

5. An apparatus for removing oil from the surface of water contaminated with oil, comprising, a slanting riser chamber having a lower contaminated water receiving end and an upper liquid discharging end, means for delivering the contaminated water to receiving end, a ceiling for the riser chamber provided with a plurality of downwardly projecting baffles spaced along the ceiling, the lengths of the baffles are so chosen, with respect to the angle of upward slant selected for the ceiling, that the bottom end of any selected baffle is lower than the top end of the lower next preceding baffle, to form pockets for retaining oil at the ceiling covering the entire surface between the baffles, whereby sloshing about of the liquid in the riser chamber is dampened, an oil-bath water cleaner comprising, an oil-filled chamber, means for delivering the contaminated water from the discharge end of the riser chamber in a continous slow flow to the top of the oil-filled chamber, where the oil in the water separates out to combine with the oil already in the oil-filled chamber and the water and excess oil flow down into an oil discharge chamber from which the oil flows to a place of storage, and means for removing the clean water from the bottom of the oil discharge chamber.

6. The apparatus as set forth in claim 4 wherein the oil-filled chamber is provided with a plurality of vertically spaced barriers each barrier having many small transverse openings that are not in line with the small openings of adjacent barrier to thus provide a circuitous path for the water passing through the small openings.

7. The apparatus as set forth in claim 5 wherein the oil-filled chamber is provided with a plurality of vertically spaced barriers each barrier having many small transverse openings that are not in line with the small openings of adjacent barrier to thus provide a circuitous path for the water passing through the small openings.

8. In an apparatus for removing oil from water that has been contaminated with oil, comprising, an oil-bath water cleaner having an inner chamber closed at its bottom, a delivery conduit, having a smaller transverse sectional area than the transverse sectional area of the inner chamber, for delivering oil contaminated water in a slow steady flow to the bottom of the inner chamber, an oil-filled chamber having an open bottom and having an air-trap at its top to close the oil-filled chamber and to exert some fluid pressure on the oil in the oil-filled chamber, liquid communicating means at the top of the inner chamber to provide for a free flow of the oil contaminated water into the oil-filled chamber near the top, at least one barrier disposed in the oil-filled chamber below the top and above the open bottom the barrier being provided with many perforations each having a transverse sectional area to effectively transmit and to change the water into globules as it passes through, an oil and water containing globule chamber disposed below the open bottom end of the oil-filled chamber whereby the oil separates out in a layer above the water and the globules of water coalesce with the water at the surface of the water to give up any oil, in the films of oil surrounding each of the globules, to the oil resting on top of the water, an oil discharge chamber, exit openings near the top of globule chamber providing a free flow of oil separated out from the water into the oil discharge chamber, said oil discharge chamber being provided with an overflow pipe for transmitting the oil to a suitable storage tank, a flow chamber having a ceiling sloping upwardly and having an intake opening near the bottom end of the sloping ceiling communicating with the oil discharge chamber and having an oil weep hole near the upper end of the sloping ceiling communicating with the oil discharge chamber, so that any oil that may still be contaminating the water can flow along the sloping ceiling to escape into the discharge chamber, an exit opening for the flow chamber, and means for withdrawing the water from the flow chamber through its exit opening.

9. In an apparatus for removing oil from water that has been contaminated with oil, comprising, an oil-bath water cleaner having an inner chamber closed at its bottom, a delivery conduit, having a smaller transverse sectional area than the transverse sectional area of the inner chamber, for delivering the oil contaminated water in a slow steady flow to the bottom of the inner chamber, an oil-filled chamber having an open bottom and having an air-trap at its top to close the oil-filled chamber and to exert some fluid pressure on the oil in the oil-filled chamber, liquid communicating means at the top of the inner chamber to provide for a free flow of the oil contaminated water into the oil-filled chamber near the top, at least one barrier disposed in the oil-filled chamber below the top and above the open bottom the barrier being provided with many perforations each having a transverse sectional area effectively transmit and to change the water into globules as it passes through, an oil and water containing globule chamber disposed below the open bottom end of the oil-filled chamber whereby the oil separates out in a layer above the water and the globules of water coalesce with the water at the surface of the water to give up any oil, in the films of oil surrounding each of the globules, to the oil resting on top of the water, an oil discharge chamber, exit openings near the top of globule chamber providing a free flow of oil separated out from the water into the oil discharge chamber, said oil discharge chamber being provided with an overflow pipe for transmitting the oil to a suitable storage tank, a screen disposed at the bottom of the globule chamber and sloping upwardly toward the exit openings in the globule chamber for causing coalescense of such globules of water as may thus far have escaped such coalescense, a flow chamber having a ceiling sloping upwardly and having an intake opening near the bottom end of the sloping ceiling communicating with the oil discharge chamber and having an oil weep hole near the upper end of of the sloping ceiling communicating with the oil discharge chamber, so that any oil that may still be contaminating the water can flow along the sloping ceiling to escape into the discharge chamber, an exit opening for the flow chamber disposed below the weep hole and near the bottom of the flow chamber, and means for withdrawing the water from the flow chamber through its exit opening.

10. In an apparatus as set forth in claim 8 wherein the air-trap for the oil-filled chamber comprises, an air-filled dome for collecting any excess air that gets into the top of the oil-filled chamber, and, an excess-air vent tube extending down into the dome to near the top of the oil-filled chamber to thus vent any excess air that collects in the dome.

11. In an apparatus as set forth in claim 9 wherein the air-trap for the oil-filled chamber comprises,
an air-filled dome for collecting any excess air that gets into the top of the oil-filled chamber, and,
an excess-air vent tube extending down into the dome to near the top of the oil-filled chamber to thus vent any excess air that collects in the dome.

12. In an apparatus for removing oil from water that has been contaminated with oil, comprising,
an oil-bath water cleaner having an inner chamber closed at its bottom,
a delivery conduit, having a smaller transverse sectional area than the transverse sectional area of the inner chamber, for delivering oil contaminated water in a slow steady flow to the bottom of the inner chamber,
an oil-filled chamber having an open bottom and having an air-trap at its top to close the oil-filled chamber and to exert some fluid pressure on the oil in the oil-filled chamber,
liquid communicating means at the top of the inner chamber to provide for a free flow of the oil contaminated water into the oil-filled chamber near the top,
a first barrier disposed below the top of the oil-filled chamber and disposed in a transverse relation thereto,
a second barrier similar to the first disposed in the oil-filled chamber but its location is between the first barrier and the bottom of the oil-filled chamber, both barriers having many perforations through the barriers, but the perforations of the second barrier are in non-aligned relation to the perforations of the first barrier, whereby the water flows down through the oil-filled chamber in a circuitous path, and the transverse sectional area of each perforation is selected to effectively transmit the water and to change the water into globules of water,
an oil and water containing globule chamber disposed below the open bottom end of the oil-filled chamber whereby the oil separates out in a layer above the water and the globules of water coalesce with the water at the surface of the water to give up any oil, in the films of oil surrounding each of the globules, to the oil resting on top of the water,
an oil discharge chamber,
exit openings near the top of the globule chamber providing a free flow of oil separated out from the water into the oil discharge chamber, said oil discharge chamber being provided with an overflow pipe for transmitting the oil to a suitable storage tank,
a flow chamber having a ceiling sloping upwardly and having an intake opening near the bottom end of the sloping ceiling communicating with the oil discharge chamber and having an oil weep hole near the upper end of the sloping ceiling communicating with the oil discharge chamber, so that any oil that may still be contaminating the water can flow along the sloping ceiling to escape into the discharge chamber,
an exit opening for the flow chamber, and
means for withdrawing the water from the flow chamber through its exit opening.

13. In an apparatus for removing oil from water that has been contaminated with oil, comprising,
an oil-bath water cleaner having an inner chamber closed at its bottom,
a delivery conduit, having smaller transverse sectional area than the transverse sectional area of the inner chamber, for delivering the oil contaminated water in a slow steady flow to the bottom of the inner chamber,
an oil-filled chamber having an open bottom and having an air-trap at its top to close the oil-filled chamber and to exert some fluid pressure on the oil in the oil-filled chamber,
liquid communicating means at the top of the inner chamber to provide for a free flow of the oil contaminated water into the oil-filled chamber near the top,
a first barrier disposed below the top of the oil-filled chamber and disposed in a transverse relation thereto,
a second barrier similar to the first disposed in the oil-filled chamber but its location is between the first barrier and the bottom of the oil-filled chamber, both barriers having many perforations through the barriers, but the perforations of the second barrier are in non-aligned relation to the perforations of the first barrier, whereby the water flows down through the oil-filled chamber in a circuitous path, and the transverse sectional area of each perforation is selected to effectively transmit the water and to change the water into globules of water,
an oil and water containing globule chamber disposed below the open bottom end of the oil-filled chamber whereby the oil separates out in a layer above the water and the globules of water coalesce with the water at the surface of the water to give up an oil, in the films of oil surrounding each of the globules, to the oil resting on top of the water,
an oil discharge chamber,
exit openings near the top of globule chamber providing a free flow of oil separated out from the water into the oil discharge chamber, said oil discharge chamber being provided with an overflow pipe for transmitting the oil to a suitable storage tank,
a screen disposed at the bottom of the globule chamber and sloping upwardly toward the exit openings in the globule chamber for causing coalescense of such globules of water as may thus far have escaped such coalescense,
a flow chamber having a ceiling sloping upwardly and having an intake opening near the bottom end of the sloping ceiling communicating with the oil discharge chamber and having an oil weep hole near the upper end of the sloping ceiling communicating with the oil discharge chamber, so that any oil that may still be contaminating the water can flow along the sloping ceiling to escape into the discharge chamber,
an exit opening for the flow chamber, disposed below the weep hole and near the bottom of the flow chamber, and
means for withdrawing the water from the flow chamber through its exit opening.

14. In an apparatus for removing oil from water that has been contaminated with oil, comprising,
an oil-bath water cleaner having an inner chamber closed at its bottom, a delivery conduit, having a smaller transverse sectional area than the transverse sectional area of the inner chamber, for delivering oil contaminated water in a slow steady flow to the bottom of the inner chamber, an oil-filled chamber having an open bottom and having an air-trap at its top to close the oil-filled chamber and to exert some fluid pressure on the oil in the oil-filled chamber, liquid communicating means at the top of the inner chamber to provide for a free flow of the oil contaminated water into the oil-filled chamber near the top, at least one barrier disposed in the oil-filled chamber below the top and above the open bottom the barrier being provided with many perforations each having a transverse sectional area to effectively transmit and to change the water into globules as it passes through, an oil and water containing globule chamber disposed below the open bottom end of the oil-filled chamber whereby the oil separates out in a layer above the water and the globules of water coalesce with the water at the surface of the water to give up any oil, in the films of oil surrounding each of the globules, to the oil resting on top of the water, an oil discharge chamber, exit openings near the top of the globule chamber providing a free flow of oil separated out from the water into the oil discharge chamber, said oil discharge chamber being provided with an overflow pipe for transmitting the oil to a suitable storage tank, a first gravitational oil separating flow-chamber having a ceiling sloping upwardly and having an intake opening near the bottom of the sloping ceiling providing fluid communication with the oil discharge chamber, the ceiling having an oil weep hole near its upper end in communication with the oil discharge chamber an exit opening near the bottom of the flow-chamber, a second gravitational oil separating flow-chamber having a ceiling sloping upwardly, with the flow-chamber being provided with an oil weep hole near the top of the sloping ceiling in communication with the oil discharge chamber, and the second flow-chamber having an intake opening in fluid communication with the exit opening at the first flow-chamber, and having an exit opening, and, means for withdrawing water from the second flow-chamber through its exit opening.

15. In an apparatus for removing oil from water that has been contaminated with oil, comprising, a oil-bath water cleaner having an inner chamber closed at its bottom, a delivery conduit, having a smaller transverse sectional area than the transverse sectional area of the inner chamber, for delivering oil contaminated water in a slow steady flow to the bottom of the inner chamber, an oil-filled chamber having an open bottom and having an air-trap at its top to close the oil-filled chamber and to exert some fluid pressure on the oil in the oil-filled chamber, liquid communicating means at the top of the inner chamber to provide for a free flow of the oil contaminated water into the oil-filled chamber near the top, at least one barrier disposed in the oil-filled chamber below the top and above the open bottom the barrier being provided with many perforations each having a transverse sectional area to effectively transmit and to change the water into globules as it passes through, an oil and water containing globule chamber disposed below the open bottom end of the oil-filled chamber whereby the oil separates out in a layer above the water and the globules of water coalesce with the water at the surface of the water to give up any oil, in the films of oil surrounding each of the globules, to the oil resting on top of the water, an oil discharge chamber, exit openings near the top of globule chamber providing a free flow of oil separated out from the water into the oil discharge chamber, said oil discharge chamber being provided with an overflow pipe for transmitting the oil to a suitable storage tank, a screen disposed at the bottom of the globule chamber and sloping upwardly toward the exit openings in the globule chamber for causing coalescense of such globules of water as may thus far have escaped such coalescense, a first gravitational oil separating flow-chamber having a ceiling sloping upwardly and having an intake opening near the bottom of the sloping ceiling providing fluid communication with the oil discharge chamber, ceiling having an oil weep hole near its upper end in communication with the oil discharge chamber, an exit opening near the bottom of the flow-chamber, a second gravitational oil separating flow-chamber having a ceiling sloping upwardly, with the flow-chamber being provided with an oil weep hole near the top of the sloping ceiling in communication with the oil discharge chamber, and the second flow-chamber having an intake opening in fluid communication with the exit opening at the first flow-chamber, and having an exit opening, and, means for withdrawing water from the second flow-chamber through its exit opening.

16. In an apparatus as set forth in claim 14 wherein the sloping ceiling of the second gravitational oil separating flow-chamber is provided with a plurality of downwardly projecting baffles spaced along the ceiling and secured thereto in fluid tight relation, and wherein the slope of the ceiling, the length of the baffles, and their spacing along the ceiling are so chosen in relation to each other that the lower end of any selected baffle is lower than the upper end at the ceiling of the next preceding baffle lower along the ceiling.

17. In an apparatus as set forth in claim 15 wherein the sloping ceiling of the second gravitational oil separating flow-chamber is provided with a plurality of downwardly projecting baffles spaced along the ceiling and secured thereto in fluid tight relation, and wherein the slope of the ceiling, the length of the baffles, and their spacing along the ceiling are so chosen in relation to each other that the lower end of any selected baffle is lower than the upper end at the ceiling of the next preceding baffle lower along the ceiling.

18. In apparatus for removing oil from water contaminated with oil, comprising, a splatter chamber having a vent opening near its top closed end for allowing the escape of air, or any other gas, that may collect in the top of the splatter chamber, a delivery tube for delivering contaminated water into the splatter chamber through a downwardly directed delivery end, the delivery end having a transverse sectional area many times less than the transverse sectional area of the splatter chamber, means in the splatter chamber coacting with the downwardly directed end of the delivery tube for spreading the liquid outwardly against the inner surface of the splatter chamber to thus slow down the downward flow of the contaminated water to cause air separation and venting of the air and to cause coalescense of the globules of oil in the contaminated water, an upwardly slanting riser chamber having a ceiling, a conduit for transmitting the contaminated water from the splatter chamber to the lower end of the slanting riser chamber, an oil sump disposed in the conduit for retaining oil and oil froth in the conduit during the periods when no contaminated water flows down through the conduit, a plurality of downwardly projecting baffles secured leak proof in spaced relation to the ceiling to form pockets for the oil along the ceiling to thus facilitate separation of the liquids of different specific gravities and to dampen out oscillations of the mixed liquids in the riser chamber, an oil-bath water cleaner, including an oil-filled chamber, means at the upper end of the riser chamber for delivering, in a continuous flow, the contaminated liquid to the top of the oil-filled chamber, where the oil in the contaminated liquid, having an affinity for the oil already there, combines with the oil in the oil-filled chamber to keep it full, and the excess oil moves down with the water into an intermediate chamber having openings along its top outer side where the oil separates out into an oil chamber, and the water passes down through suitable openings at the bottom of the intermediate chamber into the bottom of the oil chamber, means for removing oil from the top of the oil chamber, and means for removing the clean water from the bottom of the oil chamber.

19. In an apparatus as set forth in claim 13 wherein the means for withdrawing the water from the flow chamber, comprises, a differential float chamber in fluid communication with the flow chamber, a fluid discharge conduit extending, in a fluid tight manner, into the differential float chamber, the conduit having a lower end, a balance arm pivotally mounted intermediate its ends in the differential float chamber, a lower float secured to one end of the balance arm the float being so shaped that upward movement of the float will close the lower end of the conduit, an upper float secured to the other end of the balance arm, whereby any lower bouyant force acting on the upper float than the bouyant force acting on the lower float will cause upward movement of the lower float to stop any flow of fluid through the conduit.

20. In an apparatus as set forth in claim 14 wherein the means for withdrawing the water from the second flow chamber, comprises, a differential float chamber in fluid communication with the second flow chamber, a fluid discharge conduit extending, in a fluid tight manner, into the differential float chamber, the conduit having a lower end, a balance arm pivotally mounted intermediate its ends in the differential float chamber, a lower float secured to one end of the balance arm the float being so shaped that upward movement of the float will close the lower end of the conduit, an upper float secured to the other end of the balance arm, whereby any lower bouyant force acting on the upper float than the bouyant force acting on the lower float will cause upward movement of the lower float to stop any flow of fluid through the conduit.

* * * * *